United States Patent [19]
Hickok

[11] Patent Number: 5,449,454
[45] Date of Patent: Sep. 12, 1995

[54] GAS EXPELLING DEVICE FOR A CANISTER TYPE FILTER

[75] Inventor: Roy S. Hickok, Moorpark, Calif.

[73] Assignee: Aquaria, Inc., Moorpark, Calif.

[21] Appl. No.: 4,068

[22] Filed: Jan. 13, 1993

[51] Int. Cl.6 .................. B01D 19/00; A01K 63/04
[52] U.S. Cl. ................... 210/188; 210/169;
    210/416.2; 210/436; 210/437; 210/438;
    210/440; 210/443; 210/472; 261/DIG. 75
[58] Field of Search ............ 210/188, 169, 416.1,
    210/416.2, 436, 437, 438, 440, 443, 472;
    261/DIG. 75; 417/84, 421, 423.1, 423.9

[56] References Cited
U.S. PATENT DOCUMENTS

| 1,150,910 | 8/1915 | Warmington . | |
| 1,524,547 | 1/1925 | Giacobbe . | |
| 1,645,712 | 10/1927 | Meyers . | |
| 2,474,161 | 6/1949 | Pickard . | |
| 4,601,821 | 7/1986 | Sherman et al. . | |
| 4,995,794 | 2/1991 | Wycliffe | 417/423.9 |
| 5,160,607 | 11/1992 | Thiemer et al. | 210/416.2 |
| 5,230,794 | 7/1993 | Heijnen et al. . | |
| 5,294,335 | 3/1994 | Chiang . | |

FOREIGN PATENT DOCUMENTS

| 453804 | 10/1991 | European Pat. Off. . |
| 1331016 | 5/1963 | France . |
| 372829 | 3/1991 | Japan . |
| 3146105 | 6/1991 | Japan . |
| 178733 | 4/1922 | United Kingdom . |
| 206878 | 5/1922 | United Kingdom . |
| 1124637 | 10/1965 | United Kingdom . |
| 1205604 | 9/1967 | United Kingdom . |
| 1408054 | 9/1972 | United Kingdom . |
| 1416873 | 3/1973 | United Kingdom . |
| 2031749 | 4/1980 | United Kingdom . |
| 2245504 | 1/1992 | United Kingdom . |

OTHER PUBLICATIONS

Search report dated May 31, 1994, PCT application serial No. PCT/US94/00627, filed Jan. 13, 1994.
Flural Product Brochure.
Eheim Product Brochure pages.

Primary Examiner—Robert A. Dawson
Assistant Examiner—Robert James Popovics
Attorney, Agent, or Firm—Spensley Horn Jubas & Lubitz

[57] ABSTRACT

An apparatus for expelling gas from within a sealed container. The apparatus may include a device for collecting gas in a predetermined area within the container as well as a device for drawing the gas out of the predetermined area and for directing the gas into the inlet of a pump. The apparatus eliminates problems related to the buildup of gas within the container such as water noise and vapor lock.

9 Claims, 7 Drawing Sheets

GAS EXPELLING DEVICE FOR A CANISTER TYPE FILTER

BACKGROUND OF THE INVENTION

1. Field of the Invention

The present invention is directed to a device for expelling air or gas from a sealed container through which liquid is pumped.

2. Description of the Related Art

One example of a device which includes a sealed container through which liquid is pumped is an canister-type aquarium filter.

While application of the present invention is not limited to use with canister-type aquarium filters, such filters will be used to illustrate the problem in the art solved by the present invention. As described in U.S. Pat. No. 4,601,821 to Sherman et al. entitled "Free-standing Aquarium Filter," canister-type aquarium filters include a canister containing filter media, a pump, a first hose connecting the aquarium to the canister, and a second hose connecting the pump to the aquarium. The canister also includes a removable cover which allows access to the filter media within the canister.

Typically, canister-type aquarium filters operate in the following manner. First, the pump is energized and water flows out of the pump housing, through the second hose, and into the aquarium. As water flows out of the canister, the water level within the canister decreases. The decrease in water level creates a vacuum within the canister. As used herein, the term "vacuum" refers to an area of reduced pressure. The vacuum within the canister causes water in the aquarium to be drawn into the canister through the first hose. The vacuum increases until the flow of water drawn into the canister equals the flow of water pumped out of canister. The water drawn into the canister passes through a filter media and then is drawn into the pump.

One of the major problems associated with devices which draw fluid into a sealed container is a buildup of gas within the container. In the case of canister-type aquarium filters, the presence of air within the canister often results in water noise which in turn leads to user dissatisfaction. Moreover, in those filters with the pump mounted at the top of the canister, the accumulation of gas within the canister may cause a phenomenon commonly referred to as "air lock" or "vapor lock." An "air lock" occurs when gas accumulates in the pump housing or at the entrance to the pump housing and the impeller is unable to expel the gas. Eventually, the accumulated gas will prevent water from entering the pump housing and, accordingly, the pump (and filter) will malfunction.

The buildup of gas within the container may be the result of air bubbles and other dissolved gasses present in the fluid. As a variety of devices are used to aerate the water in an aquarium, air bubbles and dissolved gasses are especially prevalent in the water drawn into canister-type aquarium filters. Once inside the canister, the bubbles expand due to the vacuum within the canister and aggregate on the filter media to form larger bubbles. The larger bubbles eventually release from the aggregating surfaces and rise to the top of the canister.

Additionally, the buildup of gas within the container may be caused by gas leaking into the container at the seal between the cover and the canister. Such leaks are caused by the vacuum within the canister which draws gas into the canister. The vacuum is greatest when the container is located near or above the level of the reservoir from which the fluid is drawn. Accordingly, gas leaks into the container will be especially prevalent when the container is located at or above the reservoir level.

SUMMARY OF THE INVENTION

It is an object of the present invention to provide an air expelling device obviating, for practical purposes, the above mentioned limitations.

In accordance with the present invention, these and other objectives are achieved by providing an apparatus which traps gas in a predetermined location within the canister and draws the trapped gas into the pump. The gas may then be pumped out of the canister.

In one aspect of the invention, a diffuser cup may be arranged above the filter cartridge. As gas rises to the surface of the liquid with the container, it may be trapped by the diffuser cup. Alternatively, the cover of the container may provide an area that accumulates gas which has risen to the surface of the liquid within the container.

In another aspect of the invention, a device may be provided which generates a vacuum in the area adjacent the pump inlet. This vacuum is greater than the vacuum within other portions of the container and may be used to draw the gas which has risen to the surface of the container into the area adjacent the pump inlet. The gas may then be pumped out of the container. As a result, the amount of gas within the container may be maintained at a level below that which will result in water noise and "vapor lock."

BRIEF DESCRIPTION OF THE DRAWINGS

A detailed description of the preferred embodiment of the invention will be made with reference to the accompanying drawings.

DETAILED DESCRIPTION OF THE PREFERRED EMBODIMENT

The following is a detailed description of the best presently known mode of carrying out the invention. This description is not to be taken in a limiting sense, but is made merely for the purpose of illustrating the general principles of the invention. The scope of the invention is defined by the appended claims. Moreover, the present invention may be used in conjunction with any number of devices which draw fluid into a sealed container. For illustrative purposes only, three variations of canister-type aquarium filters will be used to demonstrate the features and advantages of the present invention.

Figure 1:
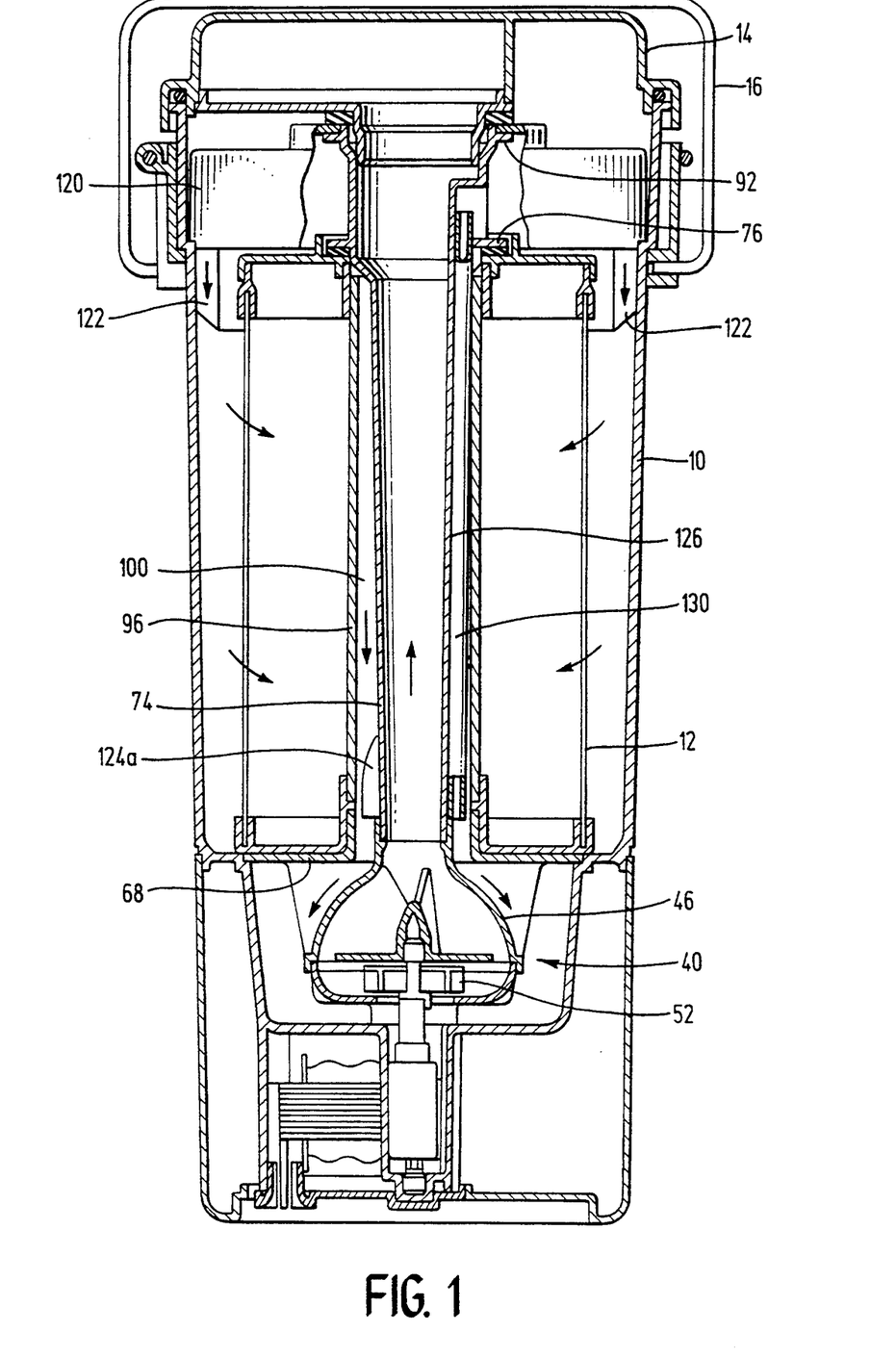
FIG. 1 is a sectional view of a canister-type filter in accordance with a preferred embodiment of the present invention.
Figure 2:
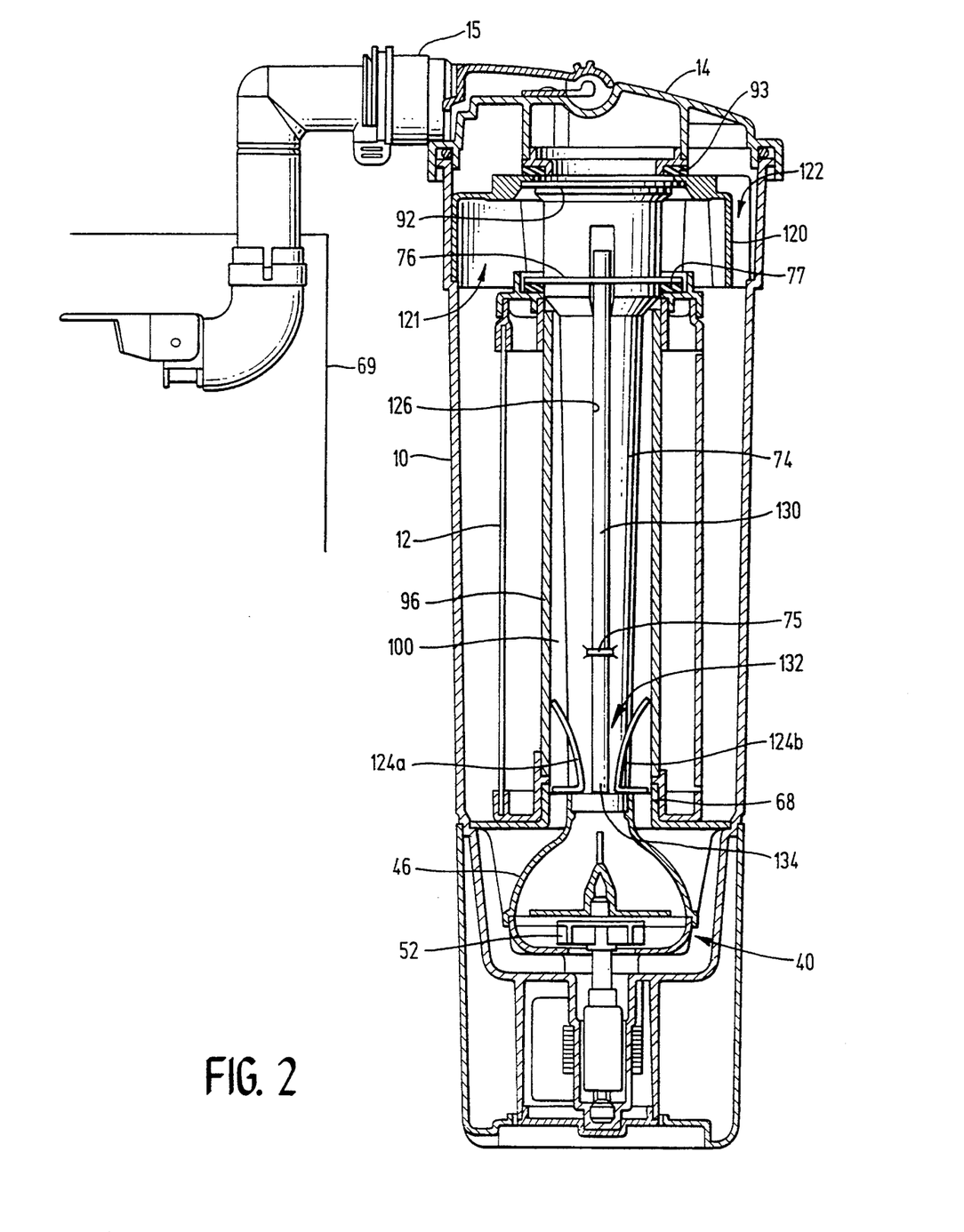
FIG. 2 is a sectional view of the embodiment illustrated in FIG. 1 rotated 90 degrees.

As illustrated for example in FIGS. 1 and 2, one such variant of canister-type aquarium filter (the subject of a commonly owned and contemporaneously filed application (our docket PD-2148) entitled "Hang on Tank Canister Filter" the subject matter of which is incorporated herein by reference) includes a canister 10, a filter cartridge 12, and a removable cover 14. A clamp wire 16 secures the cover 14 on the canister 10. The cover may include an inlet port (not visible) and an outlet port 15. The filter unit also includes a perforated tube 96, a pump 40, and a discharge tube 74. The pump 40 includes an impeller housing 46 and an impeller 52. The filter cartridge 12 includes a filter media and is supported by a plate 68. As indicated by the arrows in FIG. 1, water enters the aquarium filter from the aquarium 69 through the inlet port and flows downwardly to the filter cartridge 12. Next, the water flows through the filter cartridge 12 and the perforated tube 96 and then into an open space 100 between the perforated tube 96 and the discharge tube 74. Finally, the water flows into the bottom of the impeller housing 46, is acted on by the impeller 52, flows upwardly through the discharge tube 74 and exits the filter unit via the outlet port 15.

In accordance with the first preferred embodiment, and as illustrated for example in FIGS. 1 and 2, a diffuser cup 120 may be arranged above the filter cartridge 12. The underside of the diffuser cup defines a gas accumulation space 121. Before initiating operation of the filter, the canister 10 is first filled with water such that nearly all of the water is contained below the diffuser cup 120. When the pump 40 is started, the water level in the canister 10 drops a certain amount, which, in the illustrated embodiment, is approximately $\frac{3}{8}-\frac{1}{2}$". The drop in water level is immediately evident below the diffuser cup 120. As the air that originally occupied the space between the diffuser cup 120 and the canister cover 14 is displaced into the canister, air bubbles rise to the water surface, causing the water level below the diffuser cup 120 to drop another 3/16-¼.

Figure 3:
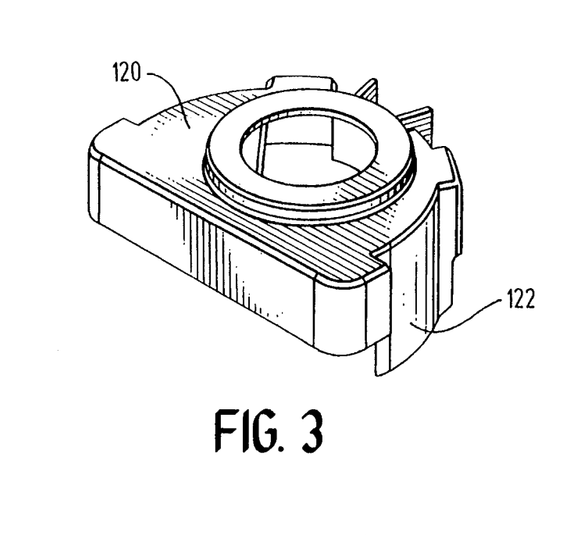
FIG. 3 is an perspective view of a diffuser cup in accordance the preferred embodiment of the present invention.
Figure 4:
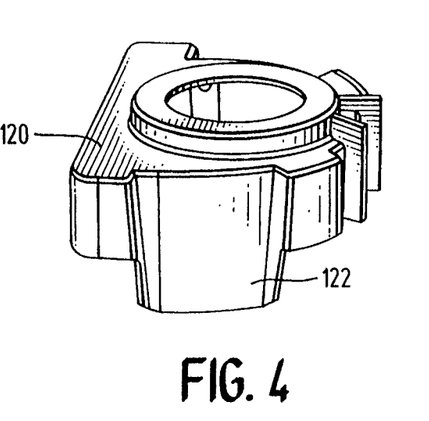
FIG. 4 is another perspective view of the diffuser cup illustrated in FIG. 3.
Figure 5:
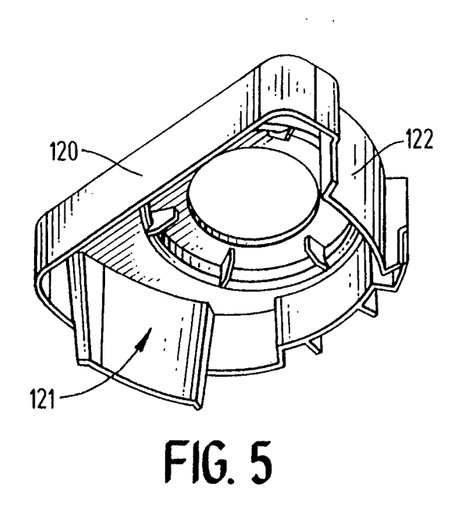
FIG. 5 is still another perspective view of the diffuser cup illustrated in FIG. 3.

As illustrated for example in FIGS. 3–5, the diffuser cup 120 may include a number of diffusing channels 122. As the pump 40 is operated, water enters the canister 10 and flows over the top of the diffuser cup 120 and into each of the diffusing channels 122 (FIG. 2). The channels 122 direct the water downwardly towards the filter cartridge 12 so that debris circulates past the filter cartridge 12 and gas is directed down into the canister 10 in the form of bubbles. As discussed above, the bubbles eventually rise to the surface of the water. The interior of the diffuser cup 120 traps most of the gas that rises to the surface. The diffuser cup 120 also supports the top portion of the discharge tube 74 such that the discharge tube remains coaxial with the impeller housing 46.

Figure 6:
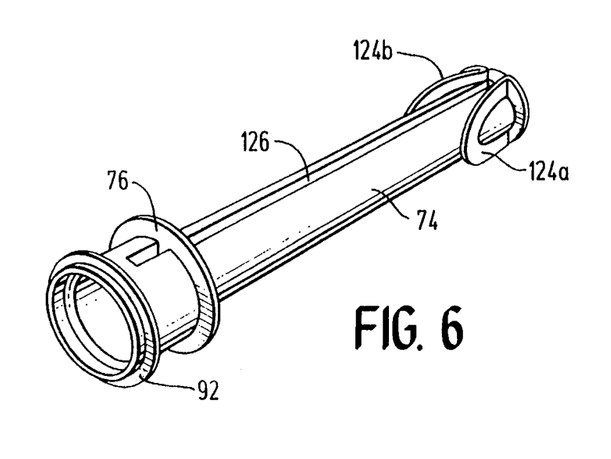
FIG. 6 is a perspective view of a discharge tube in accordance the preferred embodiment of the present invention.
Figure 7:
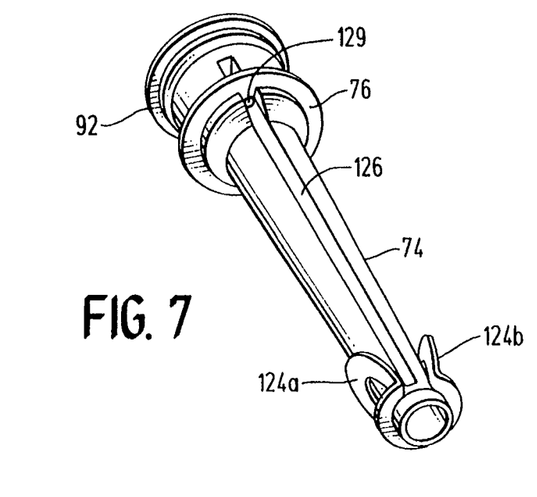
FIG. 7 is another perspective view of the discharge tube illustrated in FIG. 6.
Figure 8:
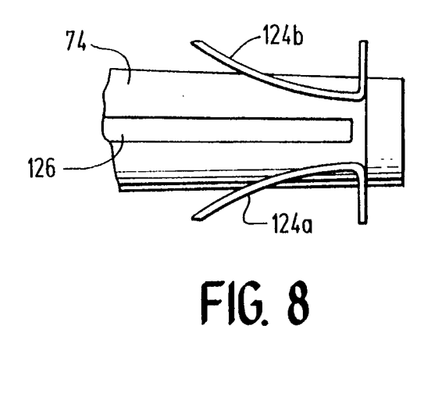
FIG. 8 is a side view of the discharge tube illustrated in FIG. 6.
Figure 9:
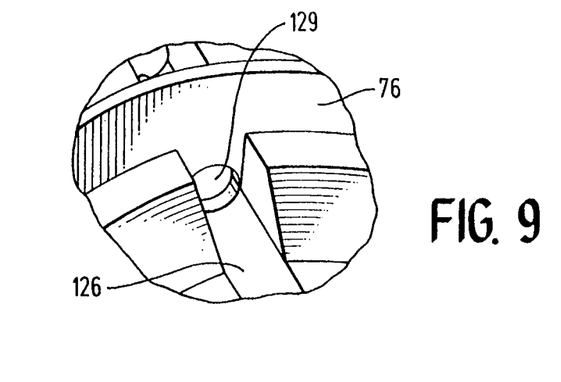
FIG. 9 is a perspective view of a portion of the discharge tube illustrated in FIG. 7.

Referring to the numbered elements in the embodiment illustrated for example in FIGS. 1, 2 and 6–9, the portion of the discharge tube 74 arranged adjacent the impeller housing 46 may include curved ribs 124a and 124b. Additionally, the discharge tube 74 may further include flanges 76 and 92. The flange 76 and a gasket 77 provide a substantially airtight seal at the top of the filter cartridge 12. The flange 92 and a gasket 93 minimize gas seepage from beneath the diffuser cup 120. A trough 126 extends along the discharge tube 74 from a point between flanges 76 and 92 to the narrowest portion of the gap defined by curved ribs 124a and 124b (FIGS. 6 and 7). The trough 126 contains a tube or conduit 130 which extends from the region under the diffuser cup 120 through a hole 129 in the flange 76 to the region adjacent the impeller housing 46. The tube 130 may be secured to the trough 126 by inserting the tube through a hole in a rib 75 (illustrated for example in FIG. 2) or by other suitable means such as epoxy, hot melt gluing, an elastomer ring, a plastic retaining clip or heat shrink tubing.

In accordance with the first preferred embodiment and as best seen in FIG. 2, water flowing in the space 100 between perforated tube 96 and discharge tube 74 is forced to flow into a constricted area 132 defined between the curved ribs 124a and 124b. Because the curved ribs 124a and 124b constrict the flow of water towards the impeller housing 46, the water accelerates as it flows through the area defined by the curved ribs 124a and 124b. The high velocity water creates a reduced pressure at the narrowest point 134 between the curved ribs as a result of the venturi effect. As such, a vacuum is created in the area adjacent plate 68 which is greater than the general, overall vacuum produced in the canister 10. The force of the vacuum at the narrowest point 134 draws water from the gas accumulation space 121 into the tube 130. The water is then drawn into the impeller housing 46 and pumped into the discharge tube 74.

As the amount of gas trapped by the diffuser cup 120 increases, the water level below the diffuser cup drops. When the water level has dropped to a level that is slightly above the top of the tube 130, a vortex is formed at the inlet of the tube. Gas trapped under the diffuser cup 120 is then drawn through the center of the vortex and into the tube 130 by the vacuum created adjacent the plate 68. The gas drawn through the tube 130 is discharged into the water stream entering the region below the plate 68. Due to the turbulence of the water in the region below the plate 68, gas bubbles will be ingested into the impeller housing 46 and subsequently pumped into the discharge tube 74 and out of the canister 10. In this manner, the buildup of air within the canister is effectively prevented, assuring proper operation of the filter.

Figure 10:
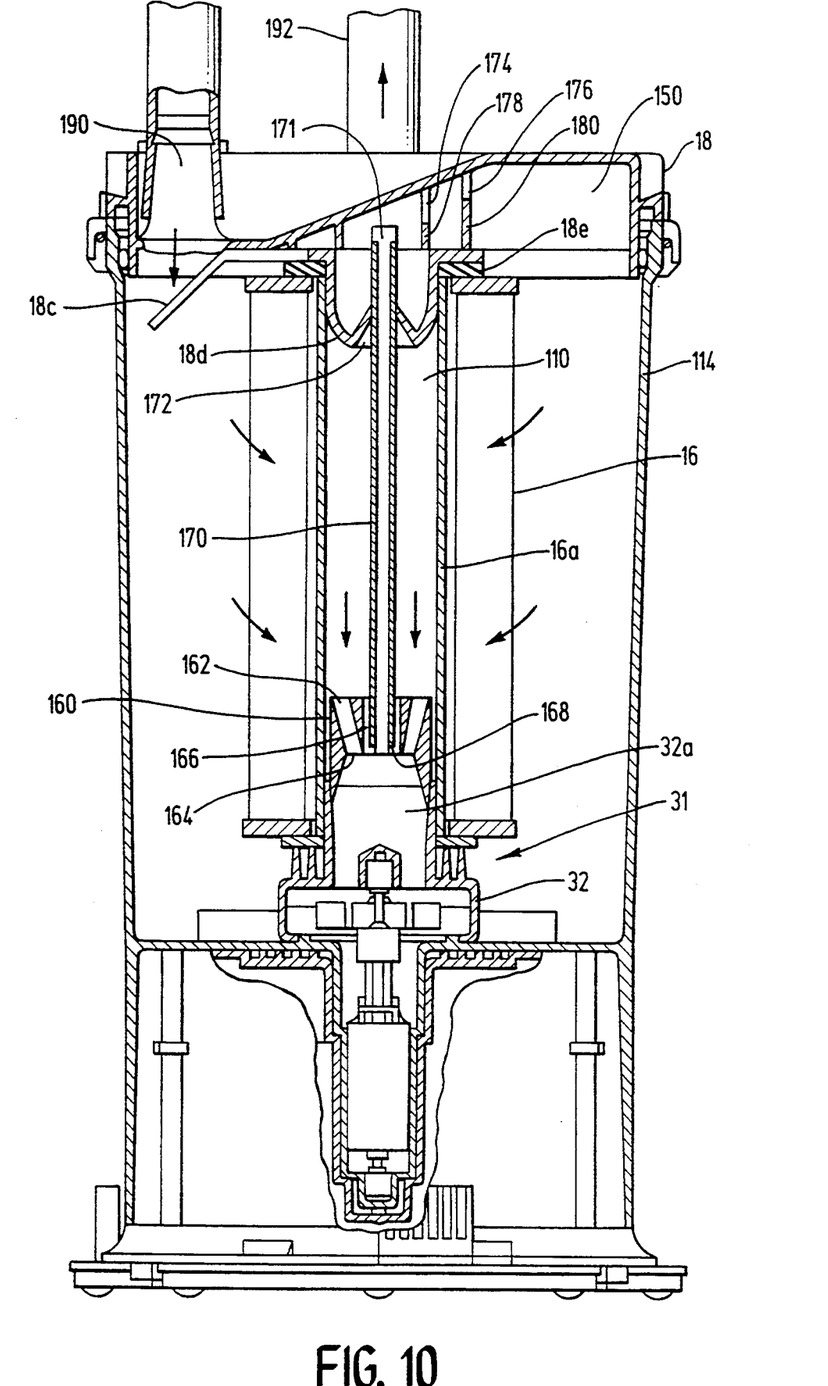
FIG. 10 is a sectional view of a second preferred embodiment of the present invention.

As illustrated in FIG. 10, a second variant of canister-type filter (the '821 patent is one example of such a species of filter) includes a canister 114, a filter cartridge 16, a perforated tube 16a and a pump 31. The pump 31 includes a pump housing 32. The pump housing 32 includes an inlet 32a. The filter also includes a cover 18 having a central extension 18d, an inlet port 190 and an outlet port (not visible). The outlet port is connected to an outlet tube 192. As indicated by the arrows in FIG. 10, water flows into the canister 114 through inlet port 190, through the filter cartridge 16 and the perforated tube 16a, and then into the open space 110. Water in the open space 110 enters the pump housing 32 at the inlet 32a and is pumped to the outlet port.

To prepare the filter for operation, the canister 10 is first filled with water to a level 1 to 2-3/4" from the top of the canister before starting the motor in the subject filter (if the canister is filled to the top, water will be forced out of the canister when the cover is installed). Prior to operating the filter the first time, the hoses from and to the aquarium typically contain air. Once the filter pump 31 is started, the air contained within the inlet hose is drawn into the canister, adding to the air present in the canister. It is preferred that the filter be stopped and allowed to "burp", that is, allow the air to rise out of the canister to be expelled through the inlet hose and tubes while water is drawn through the outlet tube and hose into the canister. However, air will likely still be present to some degree in the canister 10 after "burping" the filter and restarting.

In accordance with the second preferred embodiment, and as illustrated for example in FIG. 10, the cover 18 may include a diffuser 18c and an elevated area 150. As the filter pump 31 is operated, water enters the canister 114, flows over the diffuser 18c and is directed down to the filter cartridge 16. Debris circulates past the filter cartridge 16 and gas is directed down into the canister 114 in the form of bubbles. As discussed above, the gas bubbles will eventually rise to the surface of the water within the canister 114. The elevated area 150 provides a gas accumulation space which traps the gas that has risen to the surface of the water.

To reduce or contain the accumulation of gases in the canister 114, a venturi tube 160 may be positioned within the top portion of the inlet port 32a. The venturi tube 160 includes an inside surface 162 which defines a diameter. The diameter gradually decreases up to a transition point 164. Thereafter, the diameter of the inside surface 162 increases until the diameter is approximately equal to the inside diameter of the inlet port 32a. The venturi tube 160 also includes a step 168 and thin ribs 166 which extend inwardly from the inside surface 162. A tube 170 may be tightly held by the thin ribs 166 and supported by the step 168. The tube 170 extends from the transition point 164 to a point 171 beyond the top of filter cartridge 16.

Referring to the numbered elements in the embodiment illustrated for example in FIG. 10, the cover 18 may also include a central extension 18d which extends into the perforated tube 16a. When the cover 18 is placed onto the canister 114, a conical surface 172 guides the tube 170 into a hole in the central extension 18d. A gasket 18e provide a seal at the top of the filter cartridge 16. Finally, the cover may include ribs 178 and 180. The ribs 178 and 180 may in turn define slots 174 and 176 which allow gas and water to pass from the elevated area 150 to the area above the central extension 18d.

In accordance with the second preferred embodiment, water flowing in the space 110 is directed through the venturi tube 160. The venturi tube 160 is designed such that a vacuum will be created at the transition point 164 which is greater than the vacuum within the canister 114. The force of the vacuum draws water from the elevated area 150 into the tube 170. The water is then drawn into the impeller housing 32 and pumped to the outlet port.

As the amount of gas trapped within the elevated area 150 increases, the water level within the elevated area decreases. When the water level has decreased to a level that is slightly above the top of the tube 170, a vortex is formed at the inlet of the tube. Gas trapped within the elevated area 150 is then drawn through the center of the vortex and into the tube 170 by the vacuum created at the transition point 164. The gas drawn through the tube 170 is discharged from the tube at the transition point 164 of the venturi tube 160. The water flowing through the venturi 160 will carry the gas into the pump housing 32. The gas will then be pumped to the outlet port by pump 31.

In the two above-described embodiments, the gas expelling device will expel gas if the container or canister is not completely filled with water before starting the pump. In which case, air or gas is drawn down the collection tube (130 or 170, respectively) as soon as the pump is started, and will continue to expel air or gas until the water level in the gas accumulation area is above the entrance to the tube as described above.

Figure 11:
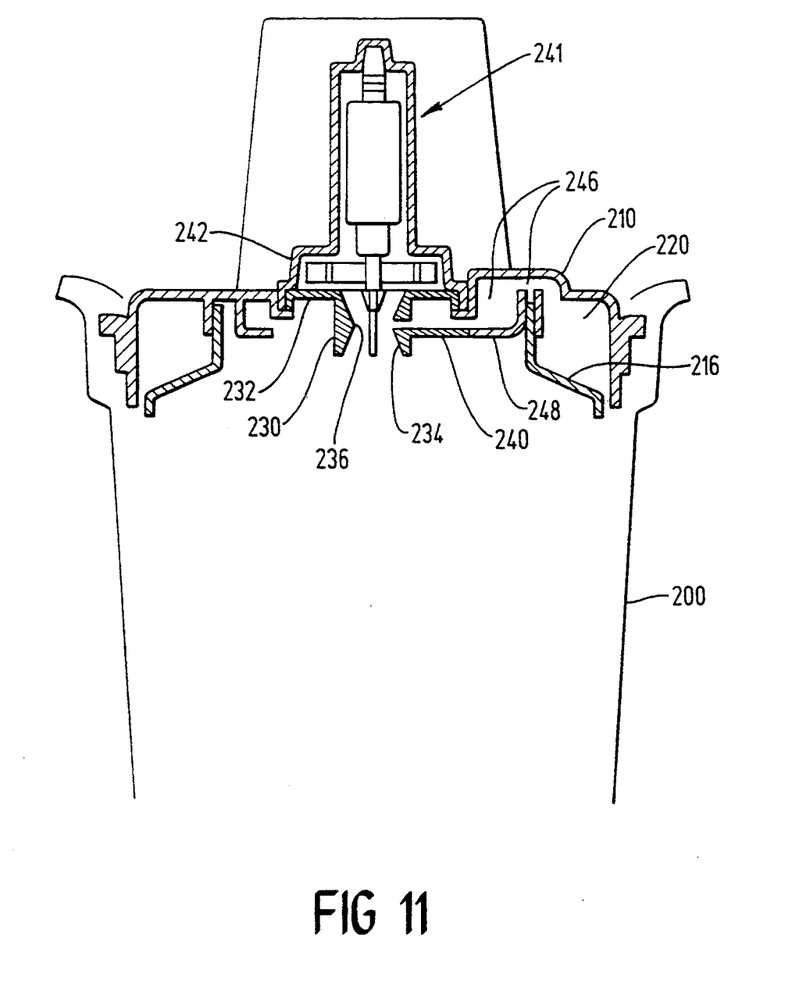
FIG. 11 is a sectional view of a third preferred embodiment of the present invention.
Figure 12:
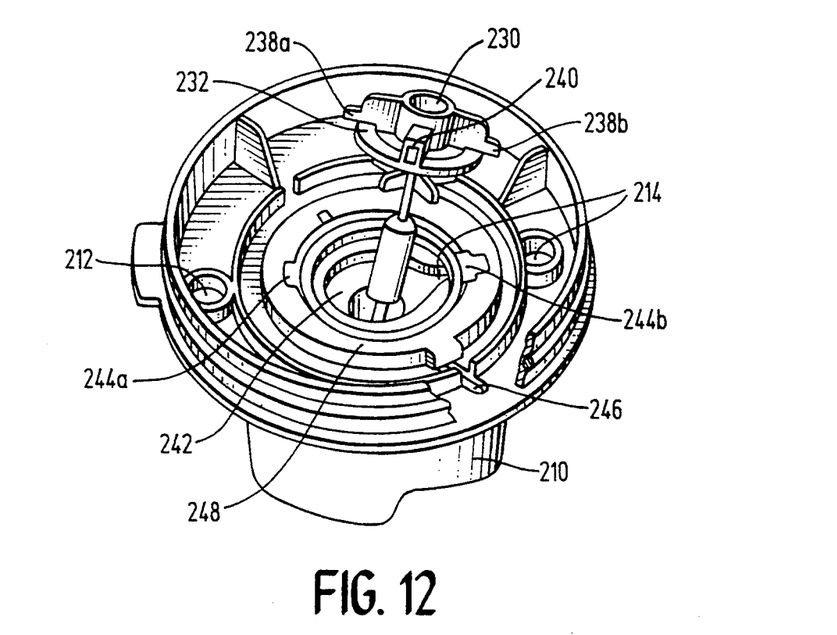
FIG. 12 is a perspective view of a cover in accordance with a third preferred embodiment of the present invention.

As illustrated in FIG. 11, a third species of canister-type filter includes a canister 200 and a cover 210. The canister 200 contains filter media. The cover 210 includes an inlet port 212 and an outlet port 214 (FIG. 12). Water from within the canister 200 is pumped to the outlet port by a pump 241 which includes a pump housing 242. The pump housing includes an inlet housing 232.

Figure 13:
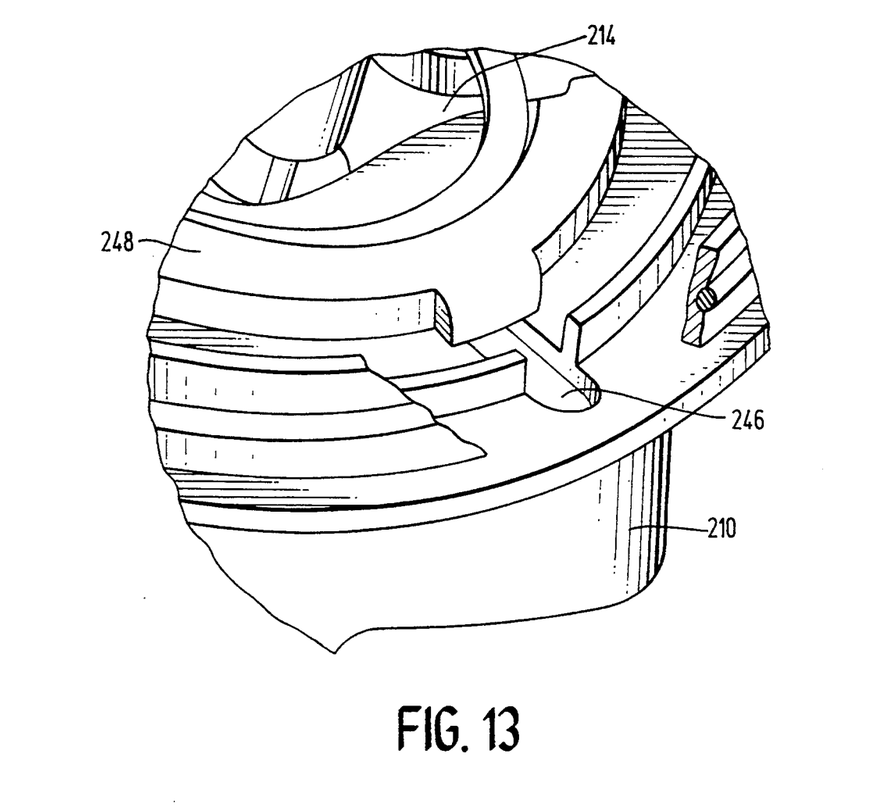
FIG. 13 is a perspective view of a portion of the cover illustrated in FIG. 12

In accordance with the third preferred embodiment, and as illustrated for example in FIGS. 11-13, a media container cover 216 may be arranged below the cover 210. The media container cover 216 and the cover 210 define an open area 220. A venturi tube 230 is positioned within the inlet housing 232. The venturi tube 230 includes an inside surface 234 which defines a diameter. The diameter gradually decreases up to a transition point 236. Thereafter, the diameter of the inside surface 234 increases until it is approximately equal to the inside diameter of the inlet housing 232. The inlet housing 232 may include a gas bleed passage or conduit 240 and projections 238a and 238b.

During assembly, the projections 238a and 238b of the inlet housing 232 are respectively aligned with depressions 244a and 244b formed in the cover 210. The inlet housing 232 is then inserted into the pump housing 242. Next, the inlet housing 232 is rotated until the projections 238a and 238b stop against locating ribs (not visible) and the gas bleed passage 240 aligns with a passage 246. The passage 246 is formed by a depression in the cover 210 and a plate 248.

In accordance with the third preferred embodiment, the media container cover 216 directs water entering inlet port 212 towards the inside wall of the canister 200 and down into the canister 200. Gas bubbles will accumulate in the open area 220 defined by the cover 210 and the media container cover 216. After passing through the filter media, the water is directed through the venturi tube 230. The venturi tube 230 is designed such that a vacuum will be produced at the transition point 236 that is greater than the vacuum within the canister 200. If gas is present in the open area 220, the gas will be drawn through passage 246 and into the gas bleed passage 240. The gas will then be discharged at the transition point 236 in the venturi tube 230. Water will then carry the gas into the pump housing 242, and from the pump 241 to the outlet port 214.

In yet another embodiment, a canister filter has an inlet port at the bottom of the canister rather than through the canister cover. In this filter, the canister is simply filled with layers of filter media and then filled with water before installing the canister cover. Typically, one then suctions the outlet tube to remove air from the canister in order for the pump to prime.

In operation, the filter typically accumulates air in the canister at the water surface below the canister cover. In accordance with the present invention, the air is expelled by adding a venturi tube similar to that of the third preferred embodiment. However, rather than providing a passageway to a specific gas accumulation area removed from the venturi tube, the venturi tube simply has a side hole or conduit in the venturi tube at the transition diameter. In operation, when the water level drops to a point slightly above the side hole, air will be ingested into the venturi. Thus, neither a specific area to trap the accumulating air nor a lengthy passageway is required.

Although the present invention has been described in terms of the preferred embodiments above, numerous modifications or additions to the above-described preferred embodiment would be readily apparent to one skilled in the art. It is intended that the scope of the present invention extends to all such modifications or additions and that the scope of the present invention is limited solely by the claims set forth below.

I claim:

1. A filter device comprising:
   a container having an inlet port for receiving water and an outlet port for delivering water, said container having a closed upper end enclosing a gas collection region;
   a pump having an inlet and an outlet, said pump outlet being in water flow communication with said outlet port;
   a filter disposed within said container and interposed between said inlet port and said pump inlet, said filter enclosing a region for containing filtered water in communication with said pump inlet;
   a conduit disposed within said region enclosed by said filter, said conduit having a gas inlet disposed for receiving gas from the gas collection region and a gas outlet disposed for delivering gas to said pump inlet; and
   gas expulsion means disposed at said gas outlet for directing water from said region enclosed by said filter past said gas outlet in order to draw gas through said conduit from the gas collection region to said pump inlet.

2. A filter device according to claim 1, wherein the gas expulsion means comprises a water flow constricting device surrounding said conduit.

3. A filter device according to claim 2, further comprising a first tube in communication with said pump inlet and a second tube in communication with said pump outlet, the first and second tubes being arranged concentrically and defining a first flow area therebetween, and wherein said water flow constricting device includes at least two rib members integral with the second tube and abutting the first tube such that the at least two rib members, the first tube and the second tube define a second flow area, the second flow area being substantially less than the first flow area.

4. A filter device according to claim 3, wherein the second tube defines a channel which receives the conduit.

5. A filter device according to claim 2, further comprising:
   an outlet tube defining a flow path between said pump outlet and said outlet port of said container, and
   a perforated disposed between said filter and said outlet tube, said outlet tube and said perforated tube delimiting a first flow area,
   wherein said water flow constricting device includes at least two rib members integral with said outlet tube and abutting said perforated tube such that said at least two rib members, said outlet tube and said perforated tube define a second flow area, said second flow area being substantially less than said first flow area.

6. A filter device according to claim 5, wherein said outlet tube defines a channel which receives said conduit.

7. A filter device according to claim 2, further comprising a substantially frustoconically shaped member arranged below the cover, the substantially frustoconically shaped member and the closed upper end of said container defining said gas collection region.

8. A filter device according to claim 1, wherein said container comprises a substantially cup-shaped member defining an open end, said substantially cup-shaped member delimiting said gas collection region and being arranged within said container such that said open end faces substantially downwardly.

9. A filter device according to claim 1, wherein said container includes a cover delimiting said gas collection region.

* * * * *